(12) United States Patent  
Perryman et al.

(10) Patent No.: US 8,442,090 B1
(45) Date of Patent: May 14, 2013

(54) EFFICIENT BURST MODE OPTICAL PARAMETRIC SOURCE

(75) Inventors: G. Paul Perryman, Arlington, TX (US); James Richard Wood, Grapevine, TX (US); Mark K. Browder, Frisco, TX (US); Edward Miesak, Windemere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 113 days.

(21) Appl. No.: 13/248,961

(22) Filed: Sep. 29, 2011

Related U.S. Application Data

(60) Provisional application No. 61/387,834, filed on Sep. 29, 2010.

(51) Int. Cl.
*H01S 3/091* (2006.01)
(52) U.S. Cl.
USPC .......... 372/70; 372/30; 372/31; 372/99
(58) Field of Classification Search ........ 372/30–31, 372/70
See application file for complete search history.

(56) References Cited

U.S. PATENT DOCUMENTS

2005/0046924 A1* 3/2005 Snell .................. 359/330
2007/0223083 A1* 9/2007 Lefebvre et al. ......... 359/330

* cited by examiner

*Primary Examiner* — Dung Nguyen
(74) *Attorney, Agent, or Firm* — Lee, Jorgensen, Pyle & Kewalramani, P.C.

(57) ABSTRACT

A method and apparatus recycle residual energy in an optical parametric burst source.

14 Claims, 2 Drawing Sheets

US 8,442,090 B1

EFFICIENT BURST MODE OPTICAL PARAMETRIC SOURCE

CROSS-REFERENCE TO RELATED APPLICATIONS

The priority of U.S. Provisional Application Ser. No. 61/387,834, entitled "Efficient Burst Mode Optical Parametric Source", and filed in the name of the inventors G. Paul Perryman et al. on Sep. 29, 2010, is hereby claimed pursuant to 35 U.S.C. §119(e). This provisional application is also hereby incorporated by reference in its entirety as if set forth verbatim herein.

STATEMENT REGARDING FEDERALLY SPONSORED RESEARCH OR DEVELOPMENT

Not applicable.

BACKGROUND OF THE INVENTION

This section of this document introduces various aspects of the art that may be related to various aspects of the present invention described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as admissions of prior art.

Historically laser sources for counter measure and remote sensing applications may utilize optical parametric oscillation ("OPO") or amplification ("OPA"). Applying these sources for military applications has significant problems with the size, weight, and power consumption in part due to OPA being relatively ineffecient. A typical OPA might use a single joule per pulse and might end with 10 mj of useful energy. These laboratory grade systems throw away significant portions of the pump laser energy because no attention has been given to system applications to utilize traditionally wasted energy.

The present invention is directed to resolving, or at least reducing, one or all of the problems mentioned above.

SUMMARY OF THE INVENTION

In a first aspect, an optical parametric burst mode source comprises: a signal source that, in operation, generates a signal; a pump source that, in operation, generates a pump; an energy recycler that recycles energy from the signal and the pump; an amplifier receiving the signal, the pump, and the recycled energy that, in operation, generates therefrom an output; and an output coupler through which the output is transmitted and from which a portion of the signal and the pump are reflected back to the energy recycler.

In a second aspect, an optical parametric burst mode source comprises: means for generating a signal; means for generating a pump; means for recycling energy reflected from the signal and the pump; means for amplifying the signal using the pump and the recycled energy to generate an output; and means for transmitting the output, reflecting a portion of the output, and reflecting a residual from the pump to the recycling means.

In a third aspect, a method for generating an optical parametric signal comprises: generating a pulsed optical signal; generating a pulsed pump; amplifying the optical signal with the pump to generate a pulsed output; transmitting the pulsed output while reflecting a portion thereof and a residual of the pump; and recycling the reflected portion and the reflected residual.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
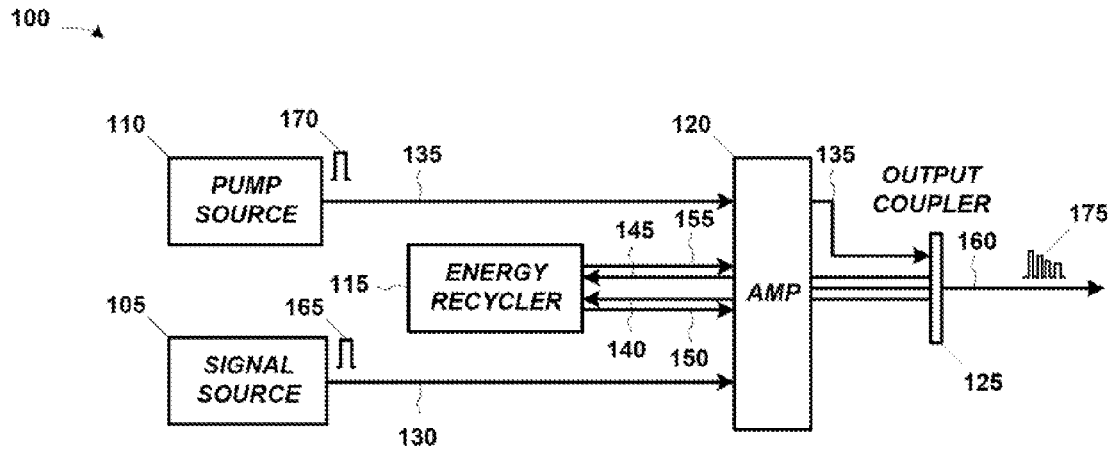
FIG. 1 conceptually illustrates an apparatus constructed and operated in accordance with the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This presently disclosed technique comprises a method and an apparatus. Through the method, the technique directly addresses the issue of wasted pump energy that, more particularly, reuses the pump energy that is traditionally dumped in conventional practice. In addition, the disclosed optical architecture by which this method is implemented in the illustrated embodiment results in a novel generation of a burst of optical pulses uniquely useful in counter measure application.

The technique is a hybrid of the Q-switched by polarization resonator and the new concept of optical parametric oscillation and amplification. The traditional OPA design of injecting a signal pulse and pump pulse into a optically nonlinear crystal is modified to place the crystal inside a circulating polarization Q-switch dumped resonator. The pump and signal energy from each pulse circulate from rear reflector to an output coupler where a portion of the signal energy is released. Meanwhile, the unconverted pump and some residual signal are returned for another pass of amplification thus allowing a more full conversion of the pump to signal and subsequent output.

The output from this architecture is a burst of pulses spaced by the round trip cavity time with the burst lasting as long as there is significant pump energy. The countermeasure application where a non-cooperative target may employ optical limiters will be effectively neutralized as the burst of pulses will result in a larger net energy deposited into the target. The timings and format of the pulses within the burst is variable and tailorable by adjusting the timing of activation of the two Pockel cells ("PC") within the OP resonator (one for pump and one for signal).

One or more specific embodiments of the present invention will be described below. The present invention is not limited to the embodiments and illustrations contained herein, but include modified forms of those embodiments including portions of the embodiments and combinations of elements of different embodiments as come within the scope of the appended claims. In the development of any such actual implementation, as in any engineering or design project, numerous implementation-specific decisions must be made to achieve the developers' specific goals, such as compliance with system-related and business related constraints, which may vary from one implementation to another. Moreover, such a development effort might be complex and time consuming, but would nevertheless be a routine undertaking of design, fabrication, and manufacture for those of ordinary skill having the benefit of this disclosure.

Turning now to the drawings, FIG. 1 conceptually depicts one particular embodiment of the apparatus of the presently disclosed technique. The apparatus is an optical parametric burst mode source 100. The optical parametric burst mode source 100 comprises a signal source 105, a pump source 110, an energy recycler 115, an amplifier 120, and an output coupler 125. The signal source 105 and pump source 110, in operation, generate a source 130 and a pump 135, respectively. The energy recycler recycles energy 140, 145, reflected from the output coupler 125 back to the amplifier 120.

The amplifier 120 receives the recycled, reflected signal and pump energy 150, 155, the signal 130, and the pump 135. The amplifier 120 infuses the signal 130 and recycled energy 150 with the energy of the pump 135 and the recycled energy 155 to generate the output 160. Note that the input to the amplifier 120 is dichroic, or of two different wavelengths. In the illustrated embodiment, the signal 130 is in the infrared band, but the invention is not so limited. The presently disclosed technique is not wavelength dependent.

More particularly, the signal 130 is a relatively weaker signal compared to the pump 135. The signal 130 defines the characteristics of the output 160 such as wavelength and pulse length while the pump 135 supplies the energy. The amplifier 120 infuses the signal 130 with the energy of the pump 135 to generate the output 160. The output 160 and whatever energy of the pump 135 that is not infused propagate from the amplifier 120 to the output coupler 125 through which the output 160 is transmitted. The output coupler 125 reflects the energy from the signal 135 that reaches it, i.e., the reflected energy 145. The output coupler 125, however, only reflects a portion of the output 160, that is, the reflected energy 140. In the illustrated embodiment, 95% of the output 160 is transmitted while 5% is reflected.

In conventional practice, the reflected energy 140, 145 is wasted in the sense that it is dumped or otherwise dissipated. The presently disclosed technique, however, then energy recycler 115 recycles that energy 140, 145, transmitting it back to the amplifier 120. The amplifier 120 then includes this recycled energy 150, 155 in the infusion process by which the output 160 is generated.

This leads to a "bursting" effect in the pulsed output 160. The signal 130 and the pump 135 are pulsed, the trigger on the signal 130 controlling the timing of the pulse of the pump 130. The pulse of the signal 130 determines the pulse of the output 160 both in terms of frequency and duration. Accordingly, the output 160 is also pulsed. The travel time for the reflected energy 140, 145 and recycled energy 150, 155 is very much smaller than the frequency of the pulses of the signal 130 and the pump 135, and therefore the pulses of the output 160.

So, in operation, the signal source 105 is triggered, generating a pulse 165 of the signal 130. This also triggers the pump source 110 to emit a pulse 170 of the pump 135. The pulses 165, 170 travel to the amplifier 120 where the pulse 170 is infused with the pulse 165 as described above. Also as described above, the output 160 propagates to the output coupler 125, where the output 160 is transmitted with a portion thereof and a residual of the pump 135 are reflected back to the energy recycler 115. The reflected energy 140, 145 is returned to the amplifier 120, whereupon the amplifier infuses the recycled energy 150 (from the signal 130) with the recycled energy 155 (from the pump 135) to generate a new output 160. This new output 160 then propagates to the optical coupler 125, whereupon it is transmitted into a field of view. A portion of the new output 160 is once again reflected as is a residual of the recycled energy 155.

This process of recycling reflected energy to generate a new output iterates until the intensity of the energy falls below some threshold at which the output 160 becomes negligible from an operational standpoint. It may therefore be referred to as "ringing down". This results in a burst of pulses as represented by the graphic 175. The pulse separation in the burst 175 is consistent and is determined by the travel time to, through, and from the energy recycler 115. Each pulse 165, 170 of the signal 130 and the pump 135 will spawn this operation, thereby resulting in a series of pulsed bursts.

Figure 2:
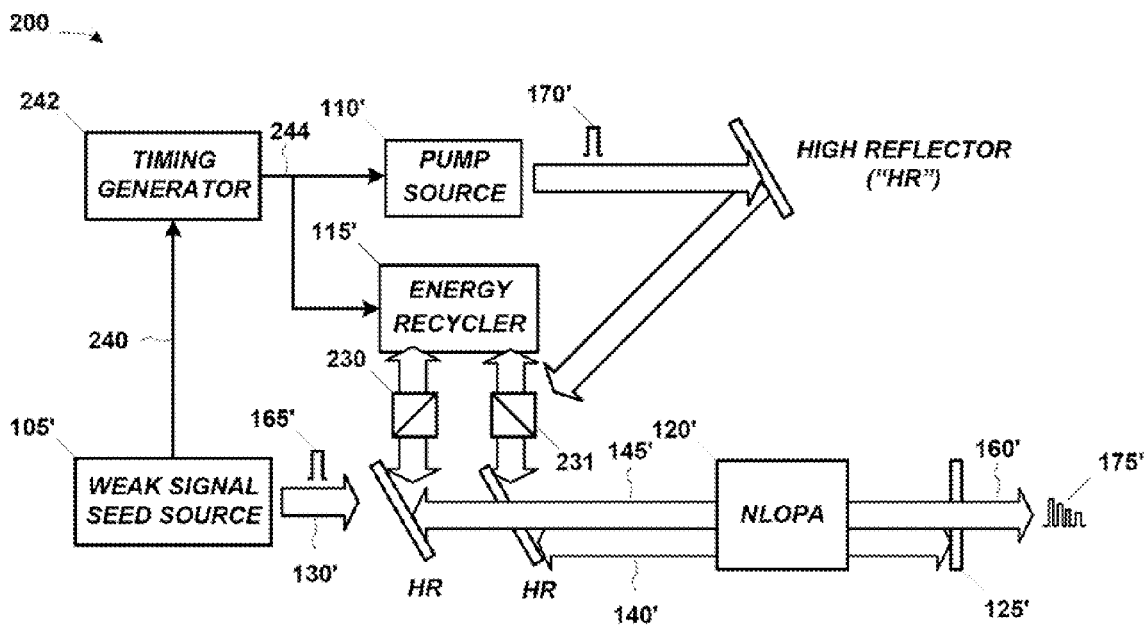
FIG. 2 depicts one particular embodiment of the apparatus in FIG. 1.
Figure 3A:
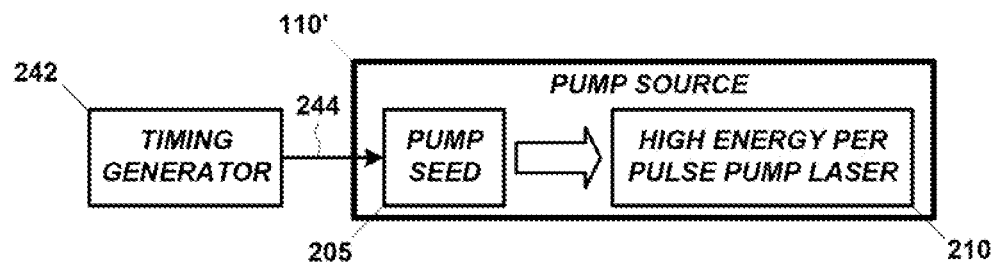
FIG. 3A-FIG. 3B illustrate particular implementations of the pump source and energy recycler, respectively, of FIG. 2.
Figure 3B:
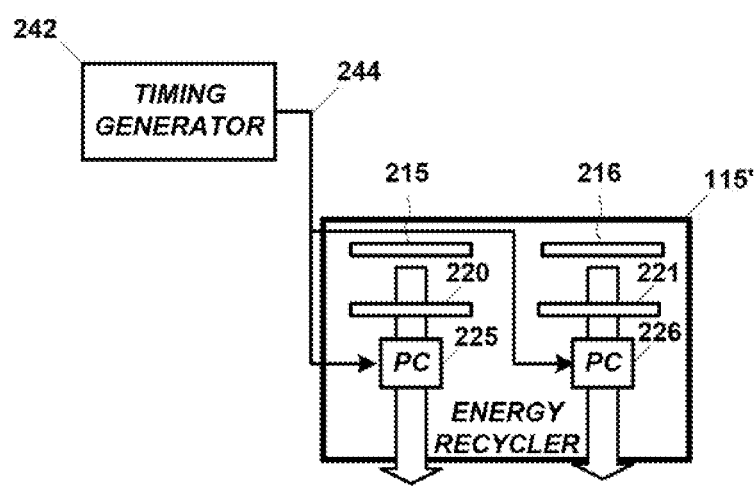

FIG. 2 conceptually depicts an optical parametric burst mode source 200 that is one particular implementation of the optical parametric burst mode source 100 of FIG. 1. The source 200 comprises a pump source 110', a signal source 105', an energy recycler 115', an amplifier 120', and an output coupler 125'. In this particular embodiment, the signal source 105' comprises a weak signal seed source. As shown in FIG. 3A, the pump source 110' includes a pump seed 205 and a high energy per pulse pump laser 210. As shown in FIG. 3B, the energy recycler 115' includes a respective high reflector 215, 216; a wave plate ("WP") 220, 221; a pockel cell ("PC") 225, 226 for each of the signal 165' and the pump 170'. There are also polarizers 230, 231 for each of the signal 165' and the pump 170'. The amplifier 120' comprises a nonlinear optical parametric amplifier ("NLOPA").

Each of these implementations are, by way of example and illustration, but one means for performing the various functionalities of the components of the source 200. For example, the weak signal seed source is but one means for generating a signal just as the NLOPA is but one means for means for amplifying the signal and the output coupler 125' is but one means for transmitting the signal. Similarly, the high reflectors 215, 216; wave plates 220, 221; pockel cells 225, 226; and polarizers 230, 231; for each of the signal 165' and the pump 170' comprise but one means for recycling energy reflected from the signal and the pump. The pump, seed 205 and high energy per pulse pump laser 210 also comprise but one means for generating a pump.

Alternative embodiments may employ other, equivalent structures that perform these functions. However, those skilled in the art will appreciate that not all embodiments will be limited to the disclosed or even equivalent structures. Some aspects of the presently disclosed technique are in fact independent of the underlying structure by which certain functions are performed.

In operation, the signal source 115' generates a signal 165' and a timing signal 240. The timing signal 240 is received by the timing generator 242 that, in turn, outputs a timing signal 244 to the pump source 110' and the energy recycler 115'. More particularly, the timing generator 242 outputs the timing signal 244 to the pump seed 305 of the pump source 110' and the pockel cells 225, 226 of the energy recycler 115'. (Those in the art will recognize that the pockel cell/polarizer combination operates as an optical switch.) The timing signals 240, 244 synchronize the operation of the pump source 110' and energy recycler 115' to the signal source 105' operation.

Responsive to the timing signal 244, the pump source 110' generates a pump 170'. In the illustrated embodiment, the high reflector 246 redirects the pump 170' to the polarizer 231. Those in the art will appreciate that the high reflector 246 is an implementation specific detail used to control the optical channel and may be omitted in some embodiments. Similarly, other means for directing the pump 170' may also be used in some embodiments.

As described above, the signal source 105' is triggered, generating a pulse 165' of the signal 130', which triggers the pump source 110' to emit a pulse 170'. The pulses 165', 170' travel to the amplifier 120' where the pulse 170' is infused with the pulse 165'. The output 160' propagates to the output coupler 125', where the output 160' is transmitted with a portion thereof and a residual of the pump 135 are reflected back to the energy recycler 115'.

The reflected energy 140', 145' is returned to the amplifier 120', whereupon the amplifier infuses the recycled energy 150' (from the signal 130) with the recycled energy 155' (from the pump 135') to generate a new output 160'. This new output 160' then propagates to the optical coupler 125', whereupon it is transmitted into a field of view. A portion of the new output 160' is once again reflected as is a residual of the recycled energy 155'. This process of recycling reflected energy to generate a new output iterates until the energy rings down as described above, resulting in a burst of pulses as represented by the graphic 175'.

The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electromechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

The presently disclosed technique will allow much smaller, lighter, and more electrically and optically efficient designs. These designs will be particularly suited for tactical military application, but the invention is not so limited. The utilization of the normally dumped pump energy, with the additional feature of generating bursts of pulses uniquely fitting a specific countermeasure application, and the broader application to narrow and wide bandwidth pulses (chirped pulsed schemes) makes this invention a significant improvement over previous designs.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An optical parametric burst mode source, comprising:
    a signal source that, in operation, generates a signal;
    a pump source that, in operation, generates a pump;
    an energy recycler that recycles energy from the signal and the pump;
    an amplifier receiving the signal, the pump, and the recycled energy that, in operation, generates therefrom an output; and
    an output coupler through which the output is transmitted and from which a portion of the signal and the pump are reflected back to the energy recycler.

2. The optical parametric burst mode source of claim 1, wherein the signal source includes a weak signal seed source.

3. The optical parametric burst mode source of claim 1, wherein the pump source includes:
    a pump seed; and
    a high energy per pulse pump laser.

4. The optical parametric burst mode source of claim 1, wherein the energy recycler includes a respective high reflector, a wave plate, a pockel cell, and a polarizer for each of the signal and the pump.

5. The optical parametric burst mode source of claim 1, wherein the output comprises pulsed bursts of energy.

6. An optical parametric burst mode source, comprising:
    means for generating a signal;
    means for generating a pump;
    means for recycling energy reflected from the signal and the pump;
    means for amplifying the signal using the pump and the recycled energy to generate an output; and
    means for transmitting the output, reflecting a portion of the output, and reflecting a residual from the pump to the recycling means.

7. The optical parametric burst mode source of claim 6, wherein the signal generating means comprises a weak signal seed source.

8. The optical parametric burst mode source of claim 6, wherein the pump generating means comprises:
    a pump seed; and
    a high energy per pulse pump laser.

9. The optical parametric burst mode source of claim 6, wherein the recycling means comprises a respective high reflector, a wave plate, a pockel cell, and a polarizer for each of the signal and the pump.

10. The optical parametric burst mode source of claim 6, wherein the amplifying means comprises a nonlinear optical parametric amplifier.

11. The optical parametric burst mode source of claim 6, wherein the output comprises pulsed bursts of energy.

12. The optical parametric burst mode source of claim 6, wherein the transmitting means comprises an optical coupler.

13. A method for generating an optical parametric signal, comprising:
- generating a pulsed optical signal;
- generating a pulsed pump;
- amplifying the optical signal with the pump to generate a pulsed output;
- transmitting the pulsed output while reflecting a portion thereof and a residual of the pump; and
- recycling the reflected portion and the reflected residual.

14. The method of claim 13, wherein the amplifying, transmitting, and recycling are iterated to ring down the pulse of the pulsed optical signal.

* * * * *